United States Patent [19]

Mittelhäuser

[11] Patent Number: 4,948,085
[45] Date of Patent: Aug. 14, 1990

[54] INTERNAL MIRROR FOR MOTOR VEHICLES

[76] Inventor: Bernhard Mittelhäuser, Am Krähenberg, 3002 Wedemark 2, Fed. Rep. of Germany

[21] Appl. No.: 284,914

[22] Filed: Dec. 15, 1988

[30] Foreign Application Priority Data

Dec. 17, 1987 [DE] Fed. Rep. of Germany ... 8716620[U]

[51] Int. Cl.⁵ .............................................. B60V 1/02
[52] U.S. Cl. .................................. 248/549; 248/900; 248/221.3; 248/222.1; 248/223.4; 350/604
[58] Field of Search ..................... 248/549, 900, 221.3, 248/223.4, 222.1, 221.4; 350/604, 632; 248/221.4

[56] References Cited

U.S. PATENT DOCUMENTS

| | | | |
|---|---|---|---|
| 2,239,978 | 4/1941 | Sanford | 248/221.3 |
| 3,631,572 | 1/1972 | Lange | 248/223.4 X |
| 4,012,022 | 3/1977 | Tomita | 208/549 |
| 4,524,941 | 6/1985 | Wood et al. | 248/549 X |
| 4,632,348 | 12/1986 | Keesling et al. | 248/222.1 |

FOREIGN PATENT DOCUMENTS

| | | | |
|---|---|---|---|
| 2354551 | 5/1975 | Fed. Rep. of Germany | 248/549 |
| 1952364 | 12/1977 | Fed. Rep. of Germany | 248/549 |

Primary Examiner—Alvin C. Chin-Shue
Attorney, Agent, or Firm—Robert W. Becker & Associates

[57] ABSTRACT

An internal mirror for a motor vehicle. A plate is secured to the vehicle, and a mirror base can be pressed onto and pulled from the plate. A spring is connected with and in the hollow base and has bent edges that engage undercuts of the plate. The spring has a tongue with a hook-like end that catches against a projection of the plate. To pull the base from the plate, this hook-like tongue end can be raised from the plate projection. The base has two side walls and one end wall that rest against the plate.

10 Claims, 1 Drawing Sheet

INTERNAL MIRROR FOR MOTOR VEHICLES

BACKGROUND OF THE INVENTION

The present invention relates to an internal mirror for a motor vehicle, including a plate that is secured to the vehicle and serves to hold the mirror proper, and also including a detachable part in the form of a mirror base for a mirror housing that accommodates a mirror body. The mirror base is adapted to be pressed in one direction onto the plate, which for this purpose is provided on opposite sides with parallel undercuts that extend in the direction in which the base is pressed onto the plate.

It is an object of the present invention to embody a mirror of the aforementioned general type in such a way that the detachable part of the mirror, i.e. the mirror base, is securely held in a vibration-proof manner, yet permits detachment and removal with simple technical means, whereby the further requirement that a detachment can occur under impact action must also be fulfilled.

BRIEF DESCRIPTION OF THE DRAWING

These and other objects and advantages of the present invention will appear more clearly from the following specification in conjunction with the accompanying schematic drawing, in which.

SUMMARY OF THE INVENTION

Figure 1:
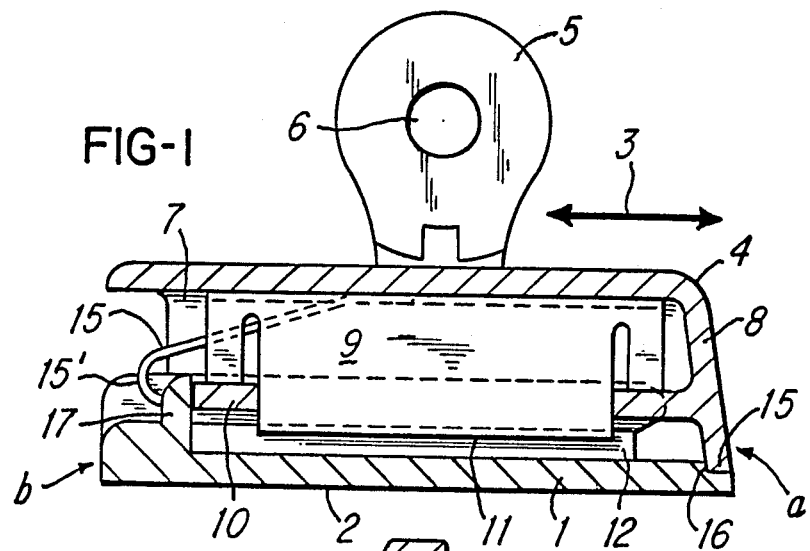
FIG. 1 is a longitudinal cross-sectional view through one exemplary embodiment of the inventive mirror base in the mounted state.

The mirror of the present invention comprises: a projection that is disposed on the plate; abutment means provided on the plate remote from the projection thereof, with the abutment means extending in the direction transverse to the direction in which the mirror base is pressed onto the plate; and a spring that is connected with and within the mirror base, which is hollow, with the spring having edges that engage the undercuts of the plate; the spring is also provided with a tongue that extends in the direction in which the base is pressed onto the plate, with this tongue having a hook-like end which, when the base is mounted on the plate, is bent toward the plate and catches against the projection of the plate; to pull the mirror base off the plate, in the direction opposite to the direction in which the base is pressed onto the plate, the hook-like end is capable of being raised from and over the projection of the plate, for example by hand; the mirror base is provided with side walls which extend essentially parallel to the direction in which the base is pressed onto and pulled off the plate, and one abutment or end wall that is provided remote from the hook-like end and, in the case of an end wall, extends essentially transverse to the direction in which the base is pressed onto and pulled off the plate; when the base is mounted on the plate, the side walls and the abutment or end wall extend toward the plate, with the side walls resting against the plate, and the abutment or end wall resting against the abutment means of the plate to thereby delimit the pressing-on movement.

Thus, by raising the tongue, for example by finger pressure, it is possible to raise the tongue free from the projection or abutment of the plate in order to then be able to remove the detachable part, i.e. the mirror base. In addition, the tongue secures the operating position of the mirror base (in other words, prevents an accidental removal thereof) because the tongue catches or engages behind the projection of the plate. When the detachable part or mirror base is placed or pressed onto the plate, the tongue is raised by running up on parts of the plate, whereupon, after the tongue has passed over these parts and the mirror base has assumed its operative position, the tongue, or at least the hook-like end thereof, assumes a position behind the projection of the plate due to the inherent tension of the spring.

Pursuant to one preferred embodiment, where the spring has an essentially U-shaped cross-sectional configuration, the tongue is formed by cutouts in the bridge or crosspiece between the two side legs of the U-shaped spring, with the tongue extending over approximately half of the length of the mirror base. This tongue is bent in the direction toward the plate.

Further specific features of the present invention will be described in detail subsequently.

DESCRIPTION OF PREFERRED EMBODIMENTS

Referring now to the drawing in detail, the only parts of the internal mirror that are illustrated are the plate 1, which serves for holding the mirror on the vehicle and has an attachment or securement surface (back surface) 2, and the mirror base 4, which can be detachably placed or pressed on this plate 1, and removed or pulled therefrom, in the direction of the double arrow 3.

The base 4 is provided with a joint or link member 5 that forms an eye 6 for receiving a pin or bolt on which an arm is pivotably disposed. Mounted on the free end of this arm is the mirror housing for accommodating the generally adjustably mounted mirror body.

The plate 1 is normally secured on the inside of the windshield, or in the vicinity thereof, in such a way that the end portion "a of the plate 1 is at the top, and the end portion "b of the plate 1 is at the bottom.

The base 4 has an essentially U-shaped cross-sectional shape with legs 7 and, in the region of the end portion "a a side wall 8 that merges into the legs 7. Conforming to the thus-formed hollow space of the base 4 is a spring 9 that is formed of sheet steel. The spring 9 is held between extensions or projections 10 of the base 4, and the free, inwardly bent edges 11 of the spring 9 catch or engage undercuts 12 of the plate 1, so that the base 4 can be held securely in position on the plate 1 yet at the same time, against spring tension, permits a longitudinal displacement of the base 4 upon the plate 1 in the direction of the double arrow 3. During this displacement, the base 4 is guided in the recesses or guides 14 of the plate 1 by the end faces 13 of the legs 7. In addition, in the mounted state, the lower edge of the side wall 8 rests against a shoulder 16 of the plate 1.

The front end of the spring 9, when viewed in the direction in which the base 4 is placed upon the plate 1, is provided with a long tongue 15, the free end of which is hook-shaped (see reference numeral 15') and catches or engages behind a projection or tab 17 of the plate 1. In this region, the base 4 has no side wall and is open in order to permit the tongue 15 to be manually raised, e.g. by a finger, over the tab 17, so that the spring catch is released and the base 4 can then be removed from the plate 1. In contrast, when the base 4 is placed upon the plate 1, it is not necessary to manipulate the tongue 15, because the hook-like end 15' of the tongue 15 slides in a yielding manner over the plate 1 and in the final position of the base 4, assumes the position illustrated in FIG. 1. It is to be understood upon impact action that the edges 11 can deform in order in this manner to enable a separation of the base 4 from the plate 1.

In order to permit the hook-like tongue end 15' to automatically slide over the tab 17 and catch therebehind during the mounting process, the front underside of the tongue 15 is greatly rounded off. In addition, the upper surface (sliding surface 18) of the plate 1 and the free end of the tab 17 are disposed at approximately the same height.

Figure 2:
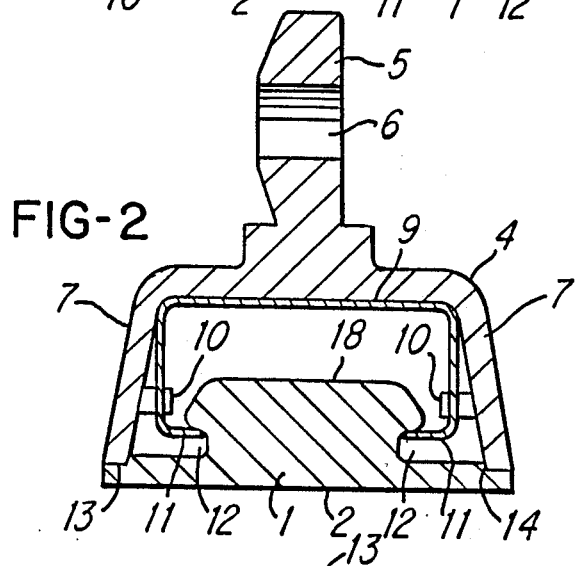
FIG. 2 is a cross-sectional view of the mirror base of FIG. 1.
Figure 3:
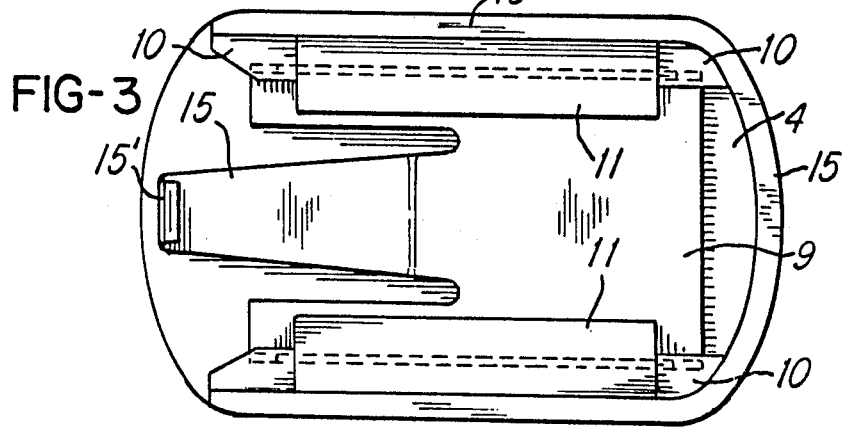
FIG. 3 is a bottom view of the mirror base in the not-mounted state.

As can be seen from FIG. 2, the spring 9 (which conforms to the cross-sectional shape of the base 4) similarly has an approximately rectangular cross-sectional shape (with inwardly bent edges 11 for engaging the undercuts 12 of the plate 1). As indicated previously, this engagement occurs under a slight yielding clamping effect of the spring 9 in order to assure a vibration-proof mounting of the base 4.

The present invention is, of course, in no way restricted to the specific disclosure of the specification and drawing, but also encompasses any modifications within the scope of the appended claims.

What I claim is:

1. An internal mirror for a motor vehicle, including a plate that is secured to the vehicle and serves to hold the mirror proper, and also including a detachable part in the form of a mirror base for a mirror housing that accommodates a mirror body, with said mirror base being adapted to be pressed in one direction onto said plate, which for this purpose is provided on opposite sides with parallel undercuts that extend in the direction in which said base is pressed onto said plate; said mirror further comprises:

a projection disposed on said plate;

abutment means provided on said plate remote from said projection thereof, with said abutment means extending in a direction transverse to the direction in which said mirror base is pressed directly onto said plate for vibration-proof mounting thereof; and a spring that is connected with and within said mirror base, which is hollow, with said spring having bent edges that engage said undercuts of said plate; said spring is also provided with a tongue that extends in the direction in which said base is pressed onto said plate, with said tongue having a hook-like end which, when said mirror base is mounted directly on said plate, is bent toward said plate and catches against said projection thereof; to be able to release and pull said base off said plate, in a direction opposite to the direction in which said base is pressed onto said plate, said hook-like end of said tongue is capable of being raised from and over said projection of said plate; said mirror base is provided with side walls that extend essentially parallel to the direction in which said base is pressed onto and pulled off said plate, and with one end wall that is provided remote from said hook-like tongue end and extends essentially transverse to said side walls; when said mirror base is mounted directly on said plate, said side walls and said end wall extend toward said plate, with said side walls resting against said plate, and said end wall resting against said abutment means of said plate;

said mirror base and said spring both having a predetermined configuration;

said spring having a crosspiece that is disposed between two side legs on which are provided said bent edges that engage said undercuts of said plate, with said crosspiece of said spring being provided with cutouts to form said tongue;

said side walls and said one end wall of said mirror base integrally merging into one another, with that end of said base in the region of said hook-like tongue end and remote from said one end wall being open to make said hook-like end accessible; and said mirror base being provided with extensions between which said spring is held.

2. A mirror according to claim 1, in which said plate is provided with recess means that extend essentially parallel to the direction in which said mirror base is pressed onto and pulled off said plate, with said side walls of said base being guided in said recess means.

3. A mirror according to claim 1, in which said hook-like end of said tongue is rounded off to facilitate pressing said base onto said plate.

4. A mirror according to claim 3, in which said projection of said plate has a free end over which said hook-like tongue end passes; and in which said plate, for said hook-like tongue end, has a sliding surface that is disposed at approximately the same level as said free end of said projection.

5. A mirror according to claim 4, in which said sliding surface of said plate merges into said free end of said projection.

6. A mirror according to claim 1, in which said mirror base and said spring both have an approximately U-shaped configuration and assure vibration-proof mounting.

7. A mirror according to claim 6, in which said tongue extends over approximately half of the length of said base.

8. A mirror according to claim 7, in which said tongue, when said mirror base is mounted on said plate, is bent toward said plate.

9. A mirror according to claim 1, in which said hook-like end is accessible by hand.

10. A mirror according to claim 1, in which said spring and said tongue are formed as a single piece.

* * * * *